United States Patent [19]
Ostlund et al.

[11] 3,878,451
[45] Apr. 15, 1975

[54] THYRISTOR CIRCUIT

[75] Inventors: Bernt Ostlund; Lars-Erik Juhlin, both of Ludvika, Sweden

[73] Assignee: Allmanna Svenska Elektriska Aktiebolaget, Vasteras, Sweden

[22] Filed: Nov. 7, 1973

[21] Appl. No.: 413,596

[30] Foreign Application Priority Data
Dec. 8, 1972  Sweden ............................. 16004/72

[52] U.S. Cl. ......................... 321/27 R; 307/252 L
[51] Int. Cl. ............................................ H02m 1/08
[58] Field of Search ..... 307/252 L, 252 Q; 321/8 R, 321/11, 27 R

[56] References Cited
UNITED STATES PATENTS

| | | | |
|---|---|---|---|
| 3,355,600 | 11/1967 | Mapham | 307/252 L |
| 3,462,619 | 8/1969 | Grecs et al. | 307/352 Q |
| 3,593,038 | 7/1971 | Cavallius et al. | 321/27 R |
| 3,643,260 | 2/1972 | Clarke | 307/252 Q |
| 3,794,908 | 2/1974 | Lindblom et al. | 321/27 R |

*Primary Examiner*—A. D. Pellinen

[57] ABSTRACT

A thyristor circuit includes a thyristor and a control circuit connected between an input electrode or terminal and the control electrode of the thyristor and fed from the voltage over the thyristor by connection to the voltage across the anode and cathode of the thyristor. This connection is made by a voltage regulator which includes a switch member composed of a transistor and a voltage dependent control member for the switch member which includes a discriminator for assuring a predetermined desired voltage over the control circuit independent of oscillations in the thyristor voltage.

4 Claims, 2 Drawing Figures

THYRISTOR CIRCUIT

BACKGROUND OF THE INVENTION

1. Field of the Invention

The present invention relates to a thyristor circuit comprising a thyristor with a control circuit connected between an input electrode and the control electrode of the thyristor and fed from the voltage over the thyristor.

2. The Prior Art

Thyristor circuits of this kind are used in thyristor rectifiers for high-voltage converters, a number of thyristors, corresponding to the rate voltage of the rectifier, with voltage dividers, being connected in series so that the thyristor rectifier may then form one branch in a rectifier bridge. The control energy for the individual thyristor is normally taken from the voltage over the thyristor as the control signal connected to the input electrode of the control circuit has very low power. While it is desirable to economize on control energy, it must be made certain that the required amount of control energy is constantly present, and the fact must be taken into consideration that the voltage over the thyristor varies during each period of the alternating current of the electronic power converter.

SUMMARY OF THE INVENTION

The purpose of the present invention is therefore to ensure the required control energy despite variations in the voltage over the thyristor and this is accomplished by connecting the control circuit to the voltage over the thyristor by way of a voltage regulator so that the desired voltage and energy in the control circuit is obtained despite the variations in the thyristor voltage.

According to the invention, a thyristor circuit includes a thyristor and a control circuit connected between an input electrode or terminal and the control electrode of the thyristor. This control circuit is fed by the voltage across the thyristor. It is fed by a voltage regulator which includes a transistor switch and a voltage dependent control member for the switch which is a discriminator which assures a predetermined desired voltage over the control circuit independent of oscillations in the thyristor voltage. The regulator includes a smoothing circuit which comprises a reactor in series with a switch and a capacitor connected in parallel with the control member and the control circuit.

The thyristor is connected in parallel with a capacitive-resistive voltage divider to which the control circuit is connected.

BRIEF DESCRIPTION OF THE DRAWINGS

The control circuit will be described, more closely with reference to the attached drawings, in which FIG. 1 shows a thyristor circuit according to the invention while

DESCRIPTION OF THE PREFERRED EMBODIMENTS

Figure 1:
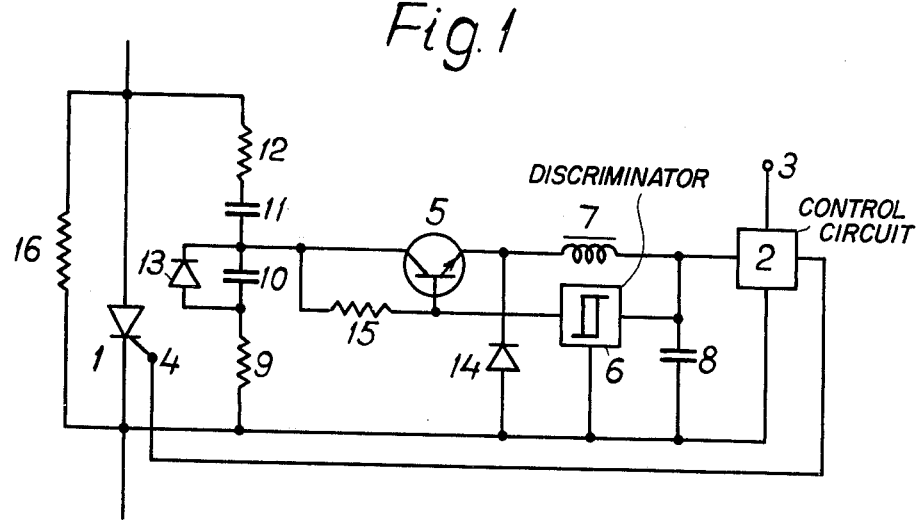

FIG. 1 illustrates a thyristor circuit with a thyristor 1 and a control circuit 2 which, for example, may be designed in accordance with Lindblom, application Ser. No. 327,437, filed Jan. 29, 1973, now U.S. Pat. No. 3,821,564, June 28, 1974. The control circuit which is fed with energy from the voltage across the thyristor has an input electrode or terminal 3, whereas the output side is connected to the control electrode 4 of the thyristor. The input side has been shown here as an electrode, but can also be in the form of a photocell influenced by light signals for controlling the electrode.

According to the invention, the feeding of the control circuit 2 is performed by way of a voltage regulator which comprises a transistor switch 5 and a voltage-sensing discriminator 6 which senses the charging voltage of a capacitor 8 connected in parallel with the control circuit. The discriminator 6 supplies control voltage to the base electrode of the transistor 5, the collector of which is connected to a voltage divider 9-12.

When the voltage across the thyristor 1 increases, the capacitor 8 and accordingly the control circuit 2 are charged from the voltage divider 9-12 by way of the transistor 5 and the reactor 7. The transistor 5 is kept conducting by a current over the resistor 15 connected between the collector and the base of the transistor. When the voltage across the capacitor 8 reaches the upper switch level of the discriminator 6, the discriminator delivers a negative control voltage to the base electrode of the transistor 5 which is thus blocked. The current through the reactor 7 proceeds through the diode 14 at the same time as the control circuit 2 continues to take up power from the capacitor 8, the voltage of which therefore decreases. When this voltage has reached the lower switching level of the discriminator 6, its output voltage disappears and the transistor 5 becomes conducting again. The voltage across the capacitor 8 and, accordingly, across the control circuit 2 will therefore oscillate between the upper and lower switching values set in the discriminator 6, thus making it possible to keep this voltage within the desired limits despite the variations in the voltage across the thyristor.

In an electronic power converter the voltage across the rectifiers consists of commutation voltages changing between negative and positive values. In order that the negative part of the commutation voltage may also be utilized and in order that there may be voltage on the control circuit even at the beginning of the positive half-period of the commutation voltage, a diode 13 is connected in parallel with the capacitor 10 in the voltage divider 9-12 with its conducting direction opposite to the thyristor 1. In this way, during the latter part of the negative half-period of the commutation voltage when the commutation voltage has a positive time derivative, the capacitor 10 will be charged with positive voltage at its upper half, thus making it possible to commence the charging of the capacitor 8 and the control circuit 2.

Figure 2:
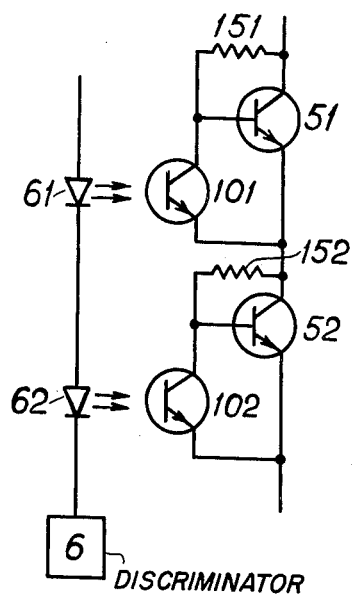
FIG. 2 shows a variant of the switch member of the voltage regulator.

The transistor 5 which is exposed to quite a considerable part of the thyristor voltage should be replaced in practice by a suitable number of series-connected transistors. In order to avoid a galvanic coupling between the discriminator 6 and the transistor 5, an optical control of the transistor can be arranged, for example according to FIG. 2 which shows a number of series-connected transistors 51, 52, and so on. The collector and base of each transistor are connected by way of resistors 151, 152 and so on, whereas the base and emitter are connected by means of phototransistors 101, 102, and so on, controlled from light diodes 61, 62 and so on, on the output side of the discriminator 6. As long as the light diodes do not receive current from 6, the transistors 51, 52 are conducting so that the capacitor 8 and the control circuit 2 are charged, but, when the voltage on the capacitor 8 increases so that 6 delivers an output signal, the bases and emitters of the transistors 51, 52 are short-circuited, 51 and 52 then being non-conducting. On the other hand, a current is obtained through the resistors 151, 152 and the phototransistors 101, 102, which current is however negligible in relation to the current through the transistors 51, 52. are short-circuited, 51 and 52 then being non-conducting. On the other hand, a current is obtained through the resistors 151, 152 and the phototransistors 101, 102, which current is however negligible in relation to the current through the transistors 51, 52. As mentioned, the thyristor circuit according to FIG. 1 is assumed to form part of a chain of similar, series-connected thyristor circuits for a high-voltage converter. For this purpose the thyristor circuit is connected in parallel with a voltage divider element 16, which normally consists of capacitors and resistors in series and parallel-connection to distribute the rectifier voltage along the chain of thyristors.

We claim:

1. Thyristor circuit comprising a thyristor (1), a control circuit (2) having an input terminal (3) and being connected to the control electrode (4) of the thyristor, voltage-regulator means connecting said control circuit with the thyristor circuit across the anode and cathode of the thyristor for supplying the voltage across the thyristor to the control circuit, said voltage-regulator means comprising a switch member (5) for opening and closing the circuit and a control member (6) dependent on the voltage in the control circuit for controlling the switch member, said control member including discriminator means with upper and lower voltage switching levels for providing a predetermined range of voltage in the control circuit independently of oscillations in the thyristor voltage.

2. Thyristor circuit according to claim 1, in which said voltage regulator means comprises a smoothing circuit comprising a reactor (7) in series with said switch member (5) and the control circuit (2) and a capacitor (8) connected in parallel with said control member (6) and said control circuit (2).

3. Thyristor circuit according to claim 1, in which the thyristor has connected in parallel with it a capacitive resistive voltage divider (9–12) and in which the control circuit (2) is connected to and fed from a part (9–12) of said voltage divider located nearest to the cathode of the thyristor, said part of the voltage divider comprising a capacitor (10) connected in parallel with a diode (13) having a conducting direction opposite to the conducting direction of the thyristor (1).

4. Thyristor circuit according to claim 1, in which said switch member (5) is a transistor switch.

* * * * *